United States Patent
Fujikake et al.

[15] 3,691,833
[45] Sept. 19, 1972

[54] DEVICE FOR DETECTING VELOCITY OF GAS THERMOELECTRICALLY

[72] Inventors: Kenji Fujikake; Norio Mutoh; Yuji Yagi, all of Nagoya, Japan

[73] Assignee: Kabushiki Kaisha Toyota Chuo Kenkyusho

[22] Filed: Aug. 26, 1970

[21] Appl. No.: 67,030

[30] Foreign Application Priority Data

Feb. 28, 1969 Japan .....................45/17556

[52] U.S. Cl.......................................73/204, 73/359
[51] Int. Cl...............................................G01f 1/00
[58] Field of Search ..............73/204, 359; 324/106

[56] References Cited

UNITED STATES PATENTS 2,314,877  3/1943  Hall............................73/204
2,612,779  10/1952  Mulford.......................73/359
2,100,260  11/1937  Miller.........................324/106
3,012,196  12/1961  Greibach................324/106 X

*Primary Examiner*—Jerry W. Myracle
*Attorney*—Clario Ceccon

[57] ABSTRACT

The miniaturized device for detecting velocity of gas thermoelectrically has a heating wire supported by a pair of metal rods and extending thereacross and two thermocouples of chromel-alumel bimetallics which have one wire common to both such wire having one end conductively connected to the heating wire at a point near or equal to the center of the heating wire. Different but closely related connecting junctions are possible. This configuration permits accurate measurement of the speed of gas streams, without interference from e.m.f. signal distortions.

19 Claims, 13 Drawing Figures

Fig. 1 (PRIOR ART)
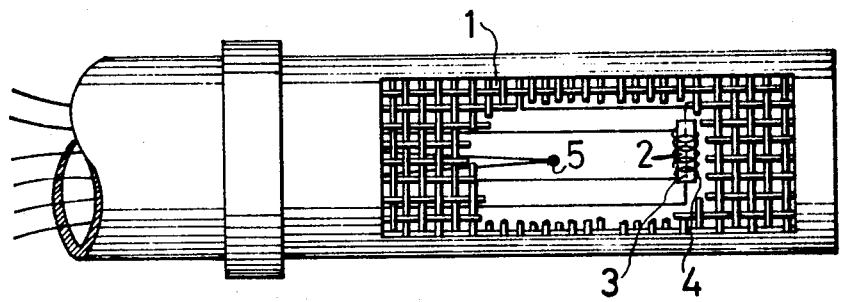
Fig. 2
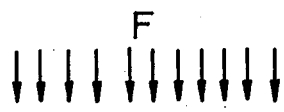
Fig. 3
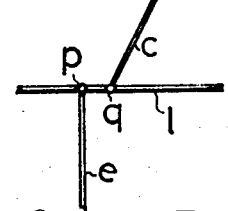
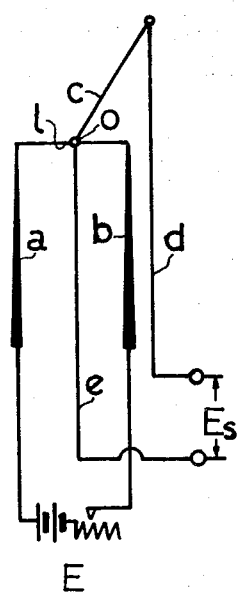
Fig. 4
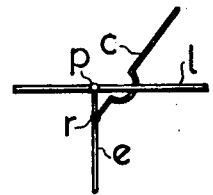
Fig. 5
Fig. 6
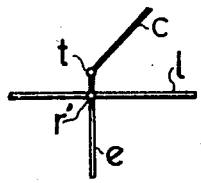
Fig. 7
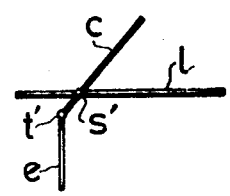

DEVICE FOR DETECTING VELOCITY OF GAS THERMOELECTRICALLY

The present invention relates to a device for detecting velocity of gas thermoelectrically and in particular, to a device of compact structure for obtaining correct measurements of the speed of an air stream within a narrow space and having local temperature variations.

Devices of the so-called thermoelectric type are in widespread use, especially the one which utilizes the principle that an electrical heating wire such as a Nichrome (registered trademark) wire, when exposed in a gas stream with the wire heated by energization with electric current, is cooled by the gas stream. This effect provides a measurement of the speed of a gas stream by the detection of temperature variations in the heating wire with thermocouples such as those made from Chromel-Alumel (registered trademarks) or Chromel-Constantan (registered trademarks) wires.

The device for detecting velocity of gas thermoelectrically of the kind described usually comprises a pair of thermocouples in its sensing portion, one of which is responsive to the temperature of the electrical heating wire to produce an e.m.f. while the other is only responsive to the temperature of the gas stream alone in producing an e.m.f. The former is referred to herein as the wind sensitive thermocouple, and the latter as the temperature compensating thermocouple. In order to correct the temperature variation of the electrical heating wire caused by the variation in temperature of the gas stream and to provide an accurate detection of only the temperature variation of the heating wire, these thermocouples are connected in series and in opposite relationship so that the e.m.f. of the wind sensitive thermocouple may be corrected by using the e.m.f. of the temperature compensating thermocouple before the output of the former is applied to an indicator or measuring apparatus which indicates or records gas speeds.

However, these devices involved many drawbacks, which will be described below with reference to FIG. 1 of the drawings which illustrates a typical prior art construction. As shown, the device comprises a sensitive portion 1 which includes a pair of thermocouples, namely, a wind sensitive thermocouple 2 enclosed within a glass tube 3 that is surrounded by a coil of the electrical heating wire 4, thus being adapted to detect the temperature of the heating wire 4 indirectly through the glass tube 3, and a temperature compensating thermocouple 5 substantially spaced from the heating wire 4 so as to be free from the influence of the wire temperature. The speed of a gas stream is measured by arranging the device so that its sensing portion 1 faces in the direction of the gas stream (which is assumed in FIG. 1 to be perpendicular to the sheet of drawing).

Because the prior art device has a sensing portion of large size, e.g. 11 mm $\phi$ × 50 mm, disturbances are caused in the gas stream, and difficulties are experienced in obtaining an accurate detection of the local gas speed within a narrow space. In addition, the large heat capacity of the part which is surrounded by the heating wire 4 and the indirect transmission of temperature variations in the heating wire 4 to the wind sensitive thermocouple 2 by means of the glass tube 3 result in a very poor response of the thermocouple 2. Further disadvantages are caused by the substantial spacing, e.g. about 10 mm between the wind sensitive thermocouple 2 and temperature compensating thermocouple 5 which spacing prevents an accurate measurement of the gas speed by an erroneous temperature compensation provided by the thermocouple 5 which there is a temperature gradient of gas in a direction transverse to the direction of the gas stream.

As a consequence, it has been hardly possible to use such thermoelectric gas speed meter of the prior art for accurately measuring the local gas speed within a narrow space and having rapid variations in temperature, such as is the case in air speed distributions in the rear of an automobile radiator, at the outlet port of a heater or air cooler or defroster.

Therefore, it is an object of the present invention to provide a compact and convenient device for detecting velocity of gas thermoelectrically which overcomes the disadvantages of the prior art devices.

It is another object of the invention to provide a compact device for detecting velocity of gas thermoelectrically which permits the precise measurement of local gas speed within a very narrow space, without causing disturbances to the gas stream.

It is a further object of the invention to provide a compact device for detecting velocity of gas thermoelectrically which is not influenced by local temperature variations in the gas stream and permits an accurate measurement of the speed of the gas stream alone.

It is still another object of the invention to provide a compact device for detecting velocity of gas thermoelectrically which has a rapid response to temperature variations of an electrical heating wire and which is capable of sensitively detecting the variation of the gas speed.

It is a still further object of the invention to provide a compact device for detecting velocity of gas thermoelectrically which is simple to manufacture, easy to handle and has a good, stabilized gas speed output characteristic.

These and other objects, features and advantages of the invention will become more apparent from the following description of the several embodiments thereof and with reference to the accompanying drawings, in which:

FIG. 1 is a perspective elevational view partly cut-away showing the construction of the sensing portion of a prior art device for detecting velocity of gas thermoelectrically;

FIG. 2 is a schematic diagram illustrating the basic construction according to the invention;

FIGS. 3 through 7 are views diagrammatically showing several variations in the connection between an electrical heating wire and a thermocouple located at the tip of the device;

Figure 8:
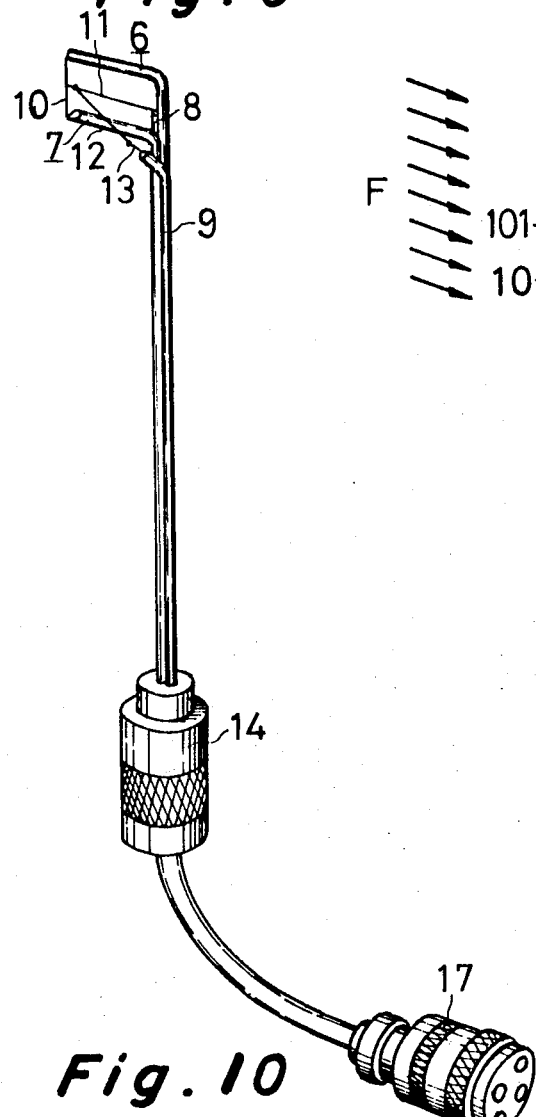
FIG. 8 is a perspective view of the entire device constructed according to a first embodiment of the invention.

Referring to the drawings, the basic construction of the device for detecting velocity of gas thermoelectrically according to the invention is schematically given in FIG. 2. As shown, the device comprises a pair of metal rods $a$ and $b$ which are mounted in the form of struts or supporting posts electrically insulated from one another and adapted to be connected at one of their ends with a power source E. Extending across and secured to the tips of the metal rods is an electrical heating wire $l$, to which is secured substantially at its center $o$ one end of a metal wire $e$ which together with another metal wire $c$ constitutes a thermocouple. The metal wires $e$ and $c$ may be of Chromel and Alumel wire, respectively for example. The metal wire $c$ has one end conductively secured to the end of the metal wire $e$ at the location $o$, thereby forming a first thermocouple. The other end of the metal wire $c$ is conductively secured with one end of a metal wire $d$ which is of the same material as the metal wire $e$, thereby forming a second thermocouple. The pair of thermocouples are thus connected in series and in opposite relationship. The temperature sensitive junction of the second thermocouple $c$–$d$ is positioned as close to the temperature sensitive junction of the first thermocouple $c$–$e$ as possible so long as it does not result in the junction of the second thermocouple being influenced by the temperature variation of the gas stream caused by the heating of the electrical heating wire $l$ upon energization thereof. The metal wire $c$ has a sufficient length to prevent the heat generated by the electrical heating wire $l$ from influencing the temperature sensitive junction of the second thermocouple by thermal conduction through the metal wire $c$.

In order for the temperature sensitive junction of the second thermocouple or the junction between the metal wires $c$ and $d$ to assume the closest possible position to the temperature sensitive junction of the first thermocouple or the junction between the metal wires $c$ and $e$ as is compatible with the prevention of the influence of the heated gas stream from the electrical heating wire $l$, the temperature sensitive junction of the second thermocouple should be located so as to be free from the influence of the heated gas stream from the heating wire $l$ when the device according to the invention is placed in a gas stream the speed of which is to be determined. In general, a thermoelectric gas speed meter aims to give an accurate measurement of the speed of a gas stream in a direction normal to the length of the electrical heating wire. Hence, when using the device of the invention, it may be located so that the temperature sensitive junction of the second thermocouple is in a most preferred operational position, assuming a gas stream normal to the heating wire $l$, as indicated by arrows F in FIG. 2. More specifically, the temperature sensitive junction of the second thermocouple is preferably positioned upstream of the heating wire $l$ as considered in the direction of the gas stream to be measured and close to the temperature sensitive junction of the first thermocouple, as is shown in FIG. 2.

However, it is also possible to provide a position for the temperature sensitive junction of the second thermocouple in a vertical plane which includes the electrical heating wire and normal to the direction of the gas stream to be measured, said position being laterally spaced from the heating wire in said plane. Moreover, it may also be positioned downstream of the heating wire $l$ and laterally spaced from a plane parallel to the direction of the gas stream and including the heating wire $l$.

When the metal rods $a$ and $b$, which have one of their terminals connected to the heating wire $l$, are connected to the power source E at their other ends so as to heat the heating wire $l$, an e.m.f. is produced across the temperature sensitive junction of the first thermocouple $c$–$e$ to give an indication of the temperature of the heating wire $l$ by means of an electrical output.

When the device is exposed to a gas stream, the temperature of the electrical heating wire $l$ is subject to variation under the influence of both the speed and the temperature of the gas stream, and such variation can be rapidly detected as a change of the e.m.f. produced in the first thermocouple by virtue of its temperature sensitive junction which is directly joined with the heating wire. On the other hand, the temperature sensitive junction of the second thermocouple $c$–$d$ is not subject to the influence of the heated gas stream from the heating wire $l$, but is only responsive to temperature variations of the gas stream to be measured so as to produce a corresponding e.m.f. Thus, the connections of the first and second thermocouples results in a partial cancellation of the electromotive forces produced by the respective thermocouples, and the resulting net e.m.f. outputs Es from the device corresponds only to the speed of the gas stream flowing in a direction normal to the electrical heating wire, independently from the temperature variations of the gas stream. This output, when applied to a gas speed indicating and recording unit, provides an accurate measurement of the gas speed. Thus, the first thermocouple directly secured to the electrical heating wire $l$ serves as the wind sensitive thermocouple, while the second thermocouple serves as the temperature compensating thermocouple, whereby the speed of a gas stream can be measured accurately, independently from the temperature of the gas stream. Specifically, the temperature of the heating wire $l$ energized with a constant current and placed in a gas stream F varies with the speed of the gas stream and a net electromotive force Es which corresponds to the difference between the temperature of the heating wire $l$ and the temperature of the gas stream can be obtained. This means that the electromotive force Es is obtainable as an amount only related to the gas speed and independent of the temperature of the gas stream.

The electromotive force Es can be expressed by the equation $$Es = KU^{-n}$$

where $U$ denotes the gas speed, and $k$ and $n$ are constants which depend on the heating power applied and on the dimensions and configuration of the electrical heating wire $l$. The constant $n$ will be hereinafter referred to as the gas speed index. Where the electrical heating wire $l$ is disposed so as to be always subject to a normal flow of the gas stream, the gas speed index $n$ assumes a constant value as indicated by $n = 0.33$ for $ud/\alpha = 0.4$ to 4, and $n = 0.39$ for $ud/\alpha = 4$ to 40, where $d$ denotes the diameter of the electrical heating wire $l$ and $\alpha$ is the dynamic coefficient of viscosity of the gas stream. As given above, the output $Es$, which is produced as a differential electromotive force between the wind sensitive and the temperature compensating thermocouples, is an exponential function of the gas speed $u$ raised to the $+n$ power.

It will be appreciated that the measurement of the gas speed will be facilitated and its accuracy improved if the gas speed - output characteristic can be linearized. In order to provide the desired linearization, an electronic circuit may be used to provide its output $Eo$ which is related to the gas speed $u$ by the expression $$Eo = K'u,$$

where $K'$ denotes a factor determined by the arrangement of the electronic circuit. Substitution of the relation $Es = KU^{-n}$ in the above expression yields:

$$Eo = K'(Es/K)-1/n = K'' Es -1/n$$

Then the linearization can be accomplished by utilizing known techniques to construct an electronic circuit which raises the input voltage $Es$ from the device to the power $+1/n$. Such electronic circuit will be hereinafter referred to as a linearizing amplifier.

In the case when a linearizing amplifier is used to effect the simultaneous measurement of the gas speed at a number of locations, or in order to achieve a good interchangeability of devices, it is desirable to have a device which exhibits a fixed gas speed - output characteristic or a fixed value of the gas speed index $n$. Ideally, the gas speed index $n$ has a fixed value when the device is so mounted that the gas stream always impinges upon the electrical heating wire $l$ at right angles thereto, as mentioned previously.

Since the device of the invention uses a single metal wire $c$ common to both thermocouples, the temperature compensating thermocouple can be approached to the wind sensitive thermocouple to an extent sufficient to prevent the influence of the gas stream heated by the electrical heating wire $l$, so that the device does not require a large space and can be integrated as a compact structure. This results in the advantages that the placement of the device in the gas stream to be measured does not cause disturbances to the gas stream, allows detection of a local gas speed within a narrow space and permits the temperature compensation even when the measurement is effected in such narrow space in the presence of a temperature gradient in a direction transverse to the direction of the gas stream, thereby rendering possible a precise determination of the gas speed within said very narrow space.

In the preceding description, the junction of the first thermocouple, that is, the junction between the metal wires $e$ and $c$ has been describe as being directly secured to the single point $o$ on the electrical heating wire $l$. In practice, the metal wires $e$ and $c$ which together form the thermocouple are very thin, e.g. 0.027 mm in diameter, so that it is not always readily feasible to secure the ends of these thin wires to the electrical heating wire $l$ which is similarly very thin, e.g. 0.005 mm, at a single point $o$. Unless extreme care is exercised in effecting this operation, it is likely that the end of the metal wire $e$ will be secured to a point $p$ on the electrical heating wire $l$ while the end of the metal wire $c$ will be secured to another point $q$ thereon with a small spacing, e.g. 0.03 mm, therebetween, as shown in FIG. 3. In such circumstances, if a d.c. power source $E$ is used, the voltage drop across the points $p$ and $q$ will be added to or subtracted from the output circuit of the wind sensitive thermocouple $c-e$, depending upon the direction of current flow. The resulting net outputs $Es$ will also include such voltage drop, whereby the gas speed - output characteristic will be non-uniform among a plurality of devices, thus preventing the interchangeability of the devices and presenting a serious barrier to a measurement which is to be performed on a plurality of locations, using a plurality of devices. While such drawback may be partly overcome by the use of an a.c. power source, it requires a relatively complex electronic circuit to supply a constant a.c. current as compared with the supply of a constant d.c. current, and the device will have an increased size.

The preferred manners of properly connecting the wires are illustrated in FIGS. 4 to 7. In FIGS. 4, the end of the metal wire $e$ is secured to the electrical heating wire $l$ substantially at the center $p$ thereof, while the end of the other metal wire $c$ is conductively connected with the metal wire $e$ at a position $r$ thereon which is very close to the point $p$, being the temperature sensitive junction of the first thermocouple $c-e$. Although this junction is not directly secured to the electrical heating wire $l$ as was the case in FIG. 2, the thermocouple shown in FIG. 4 is capable of functioning as a wind sensitive thermocouple substantially in the same manner as that illustrated in FIG. 2 because of the very close position to the heating wire $l$, the distance between the points $p$ and $n$ being for example 0.05 mm, and because of the immediate conduction of the heating temperature of the heating wire $l$ to the temperature sensitive junction point $r$ in FIG. 4.

FIGS. 5 to 7 show variants in the manner of connection illustrated in FIG. 4. As shown in FIG. 5, the end of the metal wire $c$ may be secured to the heating wire $l$ substantially at the center $q$ thereof while the end of the other metal wire $e$ may be secured to the metal wire $c$ at a position $s$ thereon which is very close to the point $q$, thereby providing a wind sensitive thermocouple having its temperature sensitive junction located at the point $s$. Alternatively, as shown in FIG. 6, the metal wire $e$, may be secured, at a position $r'$ very close to its end $t$ to the heating wire $l$ and substantially at the center thereof, while the end $t$ of the metal wire $e$ may be conductively secured with the end of the other metal wire $c$. The resulting wind sensitive thermocouple has a temperature sensitive junction at the point $t$. Conversely, the metal wire $c$ may be secured, at a position $s'$ very close to its end $t'$ to the heating wire $l$ substantially at the center thereof and the end of the metal wire $e$ secured with the tip of the metal wire $c$ which is located very close to the point $s'$, as illustrated in FIG. 7. The resulting wind sensitive thermocouple has is temperature sensitive junction at the point $t'$.

The above manners of connection may be employed to facilitate the fabrication of a wind sensitive thermocouple, which may have a rapid response to temperature variations of the electrical heating wire in substantially the same manner as when the temperature sensitive junction of the thermocouple is directly secured to the heating wire. These configurations in the connections are particularly advantageous in constructing the device of the invention.

The embodiments of the invention will now be described in detail.

Figure 9:
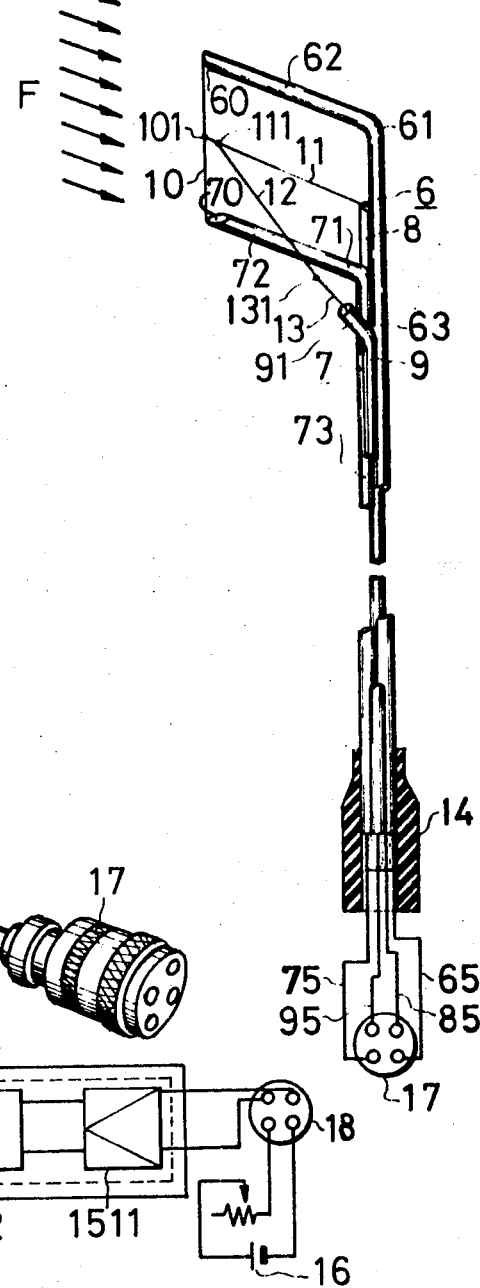
FIG. 9 is a fragmentary view, to an enlarged scale and partly in section, of the device shown in FIG. 8.

Referring specifically to FIGS. 8 and 9 which show a first embodiment of the invention, a pair of thin cylindrical rods 6 and 7 are shown, which are formed of a metal having good electrical conductivity, such as Phosphor Bronze, each rod being bevelled at its end surface 60 or 70 and bent at right angle at 61 or 71. The thin metal rods 6 and 7 are arranged so that their portions 62 and 72 between the bends 61 or 71 and their bevelled ends 60 or 70 run parallel and opposite to each other in a common plane and are spaced a given constant distance apart. Shank portions 63 and 73 of the metal rods 6 and 7 extending rearwardly of the bends are joined together, but electrically insulated from each other by, for example, a layer of synthetic resin such as Araldite. An electrical heating wire 10 of Nichrome or the like extends rectilinearly across the ends of the thin metal rods 6 and 7 and is conductively secured thereto such as by welding.

Thin rods 8 and 9 formed of a metal having good electrical conductivity, such as Phosphor Bronze (registered trademark), extend parallel to the joint shank portions 63 and 73 of the thin metal rods 6 and 7 on opposite sides thereof and in close contact therewith. One of the thin metal rods 8 extends upwardly to a position midway between the bends 61 and 71 of the thin metal rods 6 and 7. The top end of the other thin metal rod 9 is bent to a certain degree, at a position slightly below the bend 71 of the thin metal rod 7, to extend out of the plane which includes the portions 62 and 72 of the thin metal rods 6 and 7 and in a direction transverse to the direction in which the rod portions 62 and 72 are bent, as shown at 91. The thin metal rods 8 and 9 are bonded to, but electrically insulated from the rods 6 and 7 by for example an adhesive layer of synthetic resin such as Araldite.

A thin wire 11 of for example, Chromel which constitutes one of the materials forming a thermocouple, is secured at one end to the substantially central portion 101 of the electrical heating wire 10, as by welding. The other end of the thin metal wire 11 is conductively secured in similar manner to the top end of the thin metal rod 8. Conductively secured, as by welding, to the thin metal wire 11 at a position 111 which is very close to the junction 101 is one end of another thin wire 12 which is formed of a different metal, such as Alumel and which, together with the Chromel wire 11, completes the thermocouple. The thin metal wires 11 and 12, thusly, constitute a first or wind sensitive thermocouple having its temperature sensitive junction at 111. The other end of the wire 12 is conductively secured, as by welding, with one end of another thin wire 13 of the same metal as wire 11, such as Chromel. The junction point 131 between the wires 12 and 13 is sufficiently laterally spaced from the plane which includes portions 62 and 72 as well as wire 10 to be positioned clear of that part of gas stream F parallel to said plane and flowing in a direction normal to the length of the heating wire 10. The other end of the wire 13 is conductively secured as by welding to the tip of the bent end 91 of metal rod 9, both wires 12 and 13 extending rectilinearly across point 111 and the tip of rod 9. In this manner, the wires 12 and 13 constitute together the second or temperature compensating thermocouple with its temperature sensitive junction at 131.

The rear ends of the four thin metal rods 6, 7, 8 and 9 are placed within the top opening of a holder member 14 and secured therein but electrically insulated therefrom by a filler of synthetic resin which, for example may also comprise Araldite. The rear ends of the thin metal rods 6 and 7 are conductively connected with lead wires 65 and 75, respectively, and the rear ends of the thin metal rods 8 and 9 are conductively connected with lead wires 85 and 95, respectively. These two pairs of lead wires 65, 75 and 85, 95 are protruding from a bottom opening of the holder member 14, insulated therefrom, are bundled together and connected through a suitable connecting means such as a plug 17 with a heating power source 16 and with the indicating unit 15 of a device, respectively as illustrated in FIG. 10.

Figure 10:
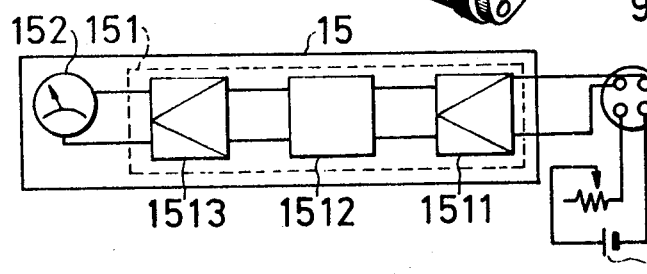
FIG. 10 is a schematic diagram of a device and indicator unit for use with the device according to the invention.

FIG. 10 shows in block diagram an example of a measuring and indicating unit of a device adapted for use in measuring the speed of a gas stream with the device of the invention. Reference numeral 18 denotes a socket, corresponding to the plug 17. The electrical output signal of the device is fed through such means 17 – 18 to a linearizing amplifier 151 which forms the measuring and indicating unit 15, the linearizing amplifier 151 being of a known type and comprising a preamplifier 1511 which amplifies the device output signal, an approximation circuit 1512 which provides a segmental linear approximation between the voltage and the gas speed, and an amplifier 1513 which provides an amplified output signal to be applied to an indicating meter 152 of the uniform scale type for a direct reading of the gas speed. Power source 16 energizes the electrical heating wire *l* of the device of the invention, and is suitably connected with the lead wires 65 and 75 when the device is in operation.

In use, the plug 17 is fitted into the corresponding socket 18 for supplying a constant current to energize the electrical heating wire 10 from the power source 16 through the lead wires 65 and 75. The sensitive forward end portion of the device is placed into the gas stream to be measured with the direction of the gas stream being substantially aligned with the plane of the forward portions 62 and 72 and of the heating wire 10 and substantially normal to the length of the heating wire 10. The device then provides an output voltage which corresponds only to the speed of the gas stream by compensating for the influence of the temperature of the gas stream, since the output voltage is obtained as a result of partial compensation of the electromotive force across the temperature sensitive junction 111 of the wind sensitive thermocouple located very close to the heating wire 10, by the electromotive force across the temperature sensitive junction 131 of the temperature compensating thermocouple that is positioned to detect the temperature variations of the gas stream to be measured without the influence of the heated gas stream from the heating wire 10. This output voltage is applied to the unit 15, which provides a substantially linearized gas speed sensitivity by virtue of its linearizing amplifier 151 and permits a direct reading of the gas speed corresponding to the output voltage at the indicating meter 152. While the power source 16 is shown as a d.c. source in FIG. 10, an a.c. source may be used instead without any adverse effect upon the performance of the device.

In order to demonstrate the compactness of the device an example of a typical sensitive forward end portion of the device constructed according to a first embodiment is given below.

Typical example

| | |
|---|---|
| Thin metal rods 6, 7 | : Phosphor Bronze rods of 0.25 mm in diameter, and about 4 mm long from the forward ends to bends 61, 71. |
| Thin metal rods 8, 9 | : Phosphor Bronze rods of 0.3 mm in diameter, bent end 91 is about 1 mm long. |
| Electrical heating wire 10 | : Nichrome wire, 0.05 mm in diameter and about 2.5 mm long. |
| Thin metal wire 11 | : Chromel wire, 0.027 mm in diameter and about 4 mm long. |
| Thin metal wire 12 | : Alumel wire, 0.027 mm in diameter and about 3 mm long. |
| Thin metal wire 13 | : Chromel wire, 0.027 mm in diameter and about 2 mm long. |

Figure 11:
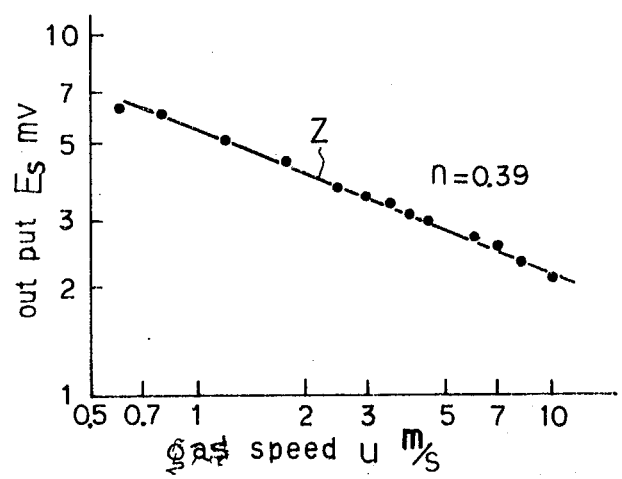
FIG. 11 is a graph showing the gas speed - output characteristic obtained with the device of the first embodiment.

The gas speed - output characteristic of a device of the above example has been tested, and is plotted in FIG. 11, wherein the abscissa represents the gas speed in logarithmic scale and the ordinate the output in logarithmic scale. As shown by the straight line Z, the device exhibits a gas speed index $n = 0.39$ which is well stabilized, producing a gas speed - output relationship of improved precision.

In view of the above mentioned arrangement of the device the following structural, performance and manufacturing advantages may be observed:

1. Because the temperature sensitive junction 111 of the wind sensitive thermocouple is positioned very close to the central portion 101 of the electrical heating wire 10, the temperature variation of the heating wire 10 is immediately transmitted to the temperature sensitive junction 111 of the wind sensitive thermocouple, thereby greatly improving the response.
2. A pair of thermocouples is provided by sharing a single thin metal wire 12 in common, which saves space and is advantageous in miniaturization of the device.
3. Since it is possible to manufacture the device with a close spacing, e.g. about 1 mm in the above example, in a direction perpendicular to the direction of the gas stream between the temperature sensitive junctions 111 and 131 of the wind sensitive and temperature compensating thermocouples, substantially complete temperature correction can be provided by a differential output from the pair of thermocouples even if there is a temperature gradient in a direction perpendicular to the direction of the gas stream, thereby permitting an accurate measurement.
4. The sensitive forward end portion of the device is greatly reduced in size, e.g. beyond the bends about 4 mm long and about 2.5 mm wide, see FIG. 9, as compared with that of prior art devices of about 11 mm $\phi \times$ 50 mm, FIG. 1. This results in the absence of disturbances to the gas stream being measured, thus allowing an accurate detection of the local gas speed within a narrow space.
5. The thin metal rods 6 and 7 provide mounting posts for the electrical heating wire 10 and also form an electrical circuit from the latter to the power source 16. This avoids current losses and simplifies the structure without recourse to auxiliary lead wires.
6. The thin metal rods 6 and 7 have their forward portions 62 and 72 bent parallel to each other, so that where it is desired to make a device having an electrical heating wire 10 of different length, the desired spacing between the forward portions which correspond to the length of the heating wire can be produced merely by axial movement of the shank portions 63 and 73 relative to each other.
7. Because the sensitive forward end portion of the device is located on a line bent substantially at right angles from the shank portions, it occupies a space of very narrow width as viewed in the direction of the gas stream being measured. This facilitates the measurement of the gas speed in a narrow space of particular shape into which the device is introduced in a direction transverse to the direction of the gas stream. Such introduction would be required when measuring the rearward flow from a radiator, for example, and in this instance, the holder member 14 of the device may be held by hand and the shank portions moved into the gas stream vertically to position the heating wire 10 normal to the direction of the gas stream.
8. The forward ends of the thin metal rods 6 and 7 are bevelled, and the bevelled end surfaces 60 and 70 are disposed opposite to each other, so that it is a simple matter to secure the opposite ends of the heating wire 10 to these ends of the thin metal rods 6 and 7, as by welding.
9. Mass production is easily achieved while maintaining a remarkably constant value of the gas speed index $n$. Thus if a device fails, it may be interchanged with excellent reliability. By using a plurality of devices having a uniform and stabilized gas speed index $n$, a simultaneous measurement of gas speed at a number of locations can be readily effected with high accuracy. Because of the uniform gas speed index which the respective devices exhibit, there is little need to adjust the linearizing amplifier, and hence the measurements are carried out efficiently by the use of a single linearizing amplifier.
10. As exemplified above, the device size can be minimized, and this leads to the possibility that a multiple point measurement can be effected to determine the distribution of the gas speed within a narrow space, whereas the prior art devices could only give a single point measurement.
11. Because the ends of the two metal wires 11 and 12 are secured together at a single point 111 close to the heating wire 10 rather than being separately secured thereto, the device output is not influenced by the polarity of the current applied to the heating wire 10 or by whether the current applied is d.c. or a.c. a.c.

12. The fabrication of the wind sensitive thermocouple is facilitated in that the two metal wires 11 and 12 constituting this thermocouple need not have their ends secured to a single point 101 on the heating wire 10. This facilitates its fabrication.

Figure 12:
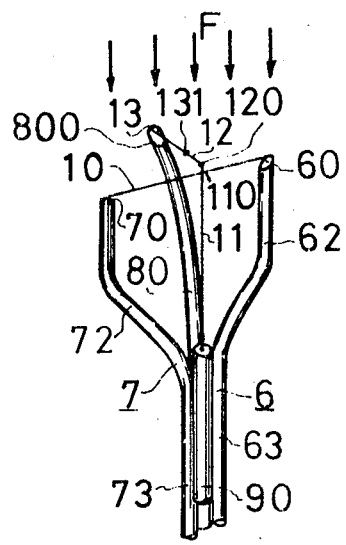
FIG. 12 is a perspective view of the principal part of the device according to a second embodiment of the invention.

A second embodiment of the present invention will now be described, making reference to FIG. 12. In this figure, elements other than the sensitive forward end portion are omitted because they are of similar construction as in the first embodiment and like parts are denoted by same reference numerals. The device according to the second embodiment comprises a pair of thin rods 6 and 7 formed of a metal, such as Phosphor Bronze, having good electrical conductivity with their ends bevelled, the bevelled end faces 60 and 70 being disposed opposite to each other with a given distance therebetween. At a given distance from the respective ends, the rods 6 and 7 are bifurcated, the terminal parts of portions 62 and 72 being substantially parallel to their shank portions 63 and 73. As before, rods 6 and 7 are arranged in a common plane with their shank portions 63 and 73 joined together, but electrically insulated from each other. An electrical heating wire 10 extends there across and is conductively secured to the top ends of the rods 6 and 7.

Thin rods 80 and 90, of for example Chromel, are arranged in juxtaposition with and on opposite sides of the junction between the shank portions 63 and 73, so as to hold the junction sandwiched therebetween. The forward end of the thin metal rod 90 terminates near the bifurcation of the shank portions 63, 73. The forward end of the thin metal rod 80 is formed with a bevelled end face 800 and extends with a gentle curve to a position above the electrical heating wire 10, the thin metal rod 80 being laterally spaced from the plane which includes the forward portions 62 and 72 of the thin metal rods 6 and 7 and the heating wire 10, and being positioned on the opposite side of said plane with its forward end lying in a plane normal to said mentioned plane.

A thin wire 11 of for example Chromel, but of the same metal as that used to form the thin metal rods 80 and 90, is secured, at junction 110, very close to its forward end 120 and substantially near the central portion of the heating wire 10. The other end of the thin wire 11 is conductively secured with the top end of the thin metal rod 90. A second thin wire 12 of for example, Alumel is secured to the forward end 120 of wire 11, thereby forming the wind sensitive thermocouple. The other end of the thin metal wire 12 is conductively secured to one end of a third thin wire 13 which of the same metal as the thin metal rods 80 and 90. The other end of the thin metal wire 13 is conductively secured to the end face 800 of rod 80 to cause the thin metal wires 12 and 13 to extend rectilinearly between the end face 800 and the forward end of the rod 11, so that their junction point 131 is located upstream of the heating wire 10, as viewed from the direction of the gas stream F to be measured, or above the heating wire 10, as illustrated in FIG. 12. In this manner, the thin metal wires 12 and 13 constitute the temperature compensating thermocouple.

While in the above description of the second embodiment, the temperature sensitive junction 131 of the temperature compensating thermocouple has been formed between the ends of the thin metal wires 12 and 13 of different metals, a simplified variant is possible when the metal rod 80, to which one end of the wire 13 is secured, is of the same metal as the latter and hence is capable of forming a thermocouple together with wire 12, by removing wire 13 and securing one end of wire 12 to the top end of the rod 80 directly. A temperature compensating thermocouple is then formed with its temperature sensitive junction located at the junction point between the metal wire 12 and the metal rod 80. This further facilitates the fabrication of the thermocouple.

The device according to the second embodiment exhibits the following features, in addition to features 1 – 5 and 8 – 12 given hereabove with respect to the first embodiment:

13 Because the temperature sensitive junction 131 of the temperature compensating thermocouple is located upstream of the electrical heating wire 10, junction 131 is not disturbed by the heated gas stream from the heating wire 10 and hence is only subject to the temperature variations of the gas stream to be measured, thereby allowing a substantially complete temperature compensation with consequent higher accuracy in the measurement of the gas speed.

The particular location of the junction 131 eliminates the need for a careful consideration of its position which might be required when locating the junction otherwise, such as downstream of the heating wire, thereby facilitating its fabrication.

14. The conductive connection of the wires 11 and 13, formed of the same metal, e.g. Chromel, and constituting the respective thermocouples with rods 90 and 80 provides a detection signal which affords an improved gas speed - output characteristic. This may be explained by referring to the first embodiment, where in the example given Phosphor Bronze used use to form the thin metal rods 8 and 9. While the use of Phosphor Bronze is advantageous from the viewpoint of cost, a possibility then arises that the junction point between wire 11 and metal rod 8 or between wire 13 and metal rod 9 may give rise to an electromotive force in the similar manner as the temperature sensitive junction of a thermocouple, because of the heterogeneous metal junction, thereby causing an unfavorable influence upon the accuracy of the measurement of gas speed. This, however, does not prevent the operability of the first embodiment, since such effect can be avoided by properly choosing the distance from the heating wire 10 to the top ends of the thin metal rods 8 and 9.

Figure 13:
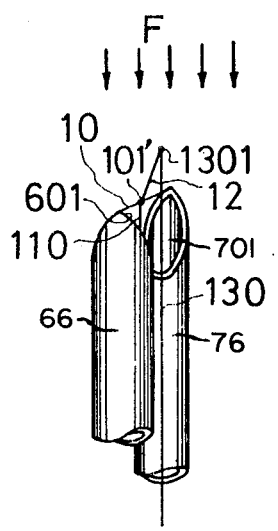
FIG. 13 is a perspective view of the principal part of the device constructed according to a third embodiment of the invention.

Referring now to FIG. 13, a third embodiment of the invention will be described. Parts other than the sensitive forward end portion are similarly constructed as in the first embodiment, and therefore are not shown in this figure. The device according to this embodiment comprises a pair of thin tubes or cylinders 66 and 76 which may be formed of stainless steel. The ends of the tubes 66 and 76 are cut along planes which are inclined with respect to their axes to provide openings 601 and 701. The tubes 66 and 76 are joined together but electrically insulated from each other, with the openings 601 and 701 facing opposite to each other. An electrical heating wire 10 extends across and is conductively secured to the forward edges of the tubes 66 and 76. One end of a thin wire 110 formed of for example Chromel, is conductively secured to the end of another thin wire 12 formed of different metal, such as Alumel, and the junction point 101' between them is secured substantially to the central part of the heating wire 10, the point 101' being the temperature sensitive junction of the wind sensitive thermocouple. The wire 110 extends parallel to the tubes 66 and 76 and is electrically insulated therefrom. The other end of the wire 12 is conductively secured to one end of wire 130 formed of the same metal as the wire 110, and the junction point 1301 therebetween is positioned upstream of the heating wire 10 or above the latter as viewed in FIG. 13. The point 1301 forms the temperature sensitive junction of the temperature compensating thermocouple. The wire 130 extends parallel to the tubes 66 and 76, and is arranged on the opposite side of the wire 110 in an electrically insulating relationship with the tubes 66 and 76. The rear ends of tubes 60, 70 and the thin metal wires 110, 130 are directly embedded in a holder as in the first embodiment for connection with the indicating and the power source.

The device constructed according to the third embodiment described above exhibits the following features, in addition to those listed hereabove as features 2 – 5 and 8 – 10:

15. As in the case of the device according to the second embodiment, the temperature sensitive junction 1301 of the temperature compensating thermocouple is located clear of the heated gas stream from the electrical heating wire 10, and hence is useful to provide an accurate measurement of the gas speed.
16. Except for the metal wire 12 which is common to both thermocouples, the respective metal wire 110 and 130 have their ends which are not connected to wire 12 directly embedded in a holder, similar by to that shown at 14 in FIG. 1, and thus there is no possibility that they be secured to any other heterogeneous metal wire to form an additional thermocouple in the vicinity of the heating wire 10.
17. The structure comprising the pair of tubes 66 and 76 in juxtaposition provides even increased mechanical strength as compared with a structure using thin metal rods. The diameter of the tubes can be so selected that their total dimension is sufficient to determine the maximum diameter of the sensitive forward end portion of the device within which to receive any other necessary member.
18. Direct securement of junction 101' of the wind sensitive thermocouple substantially to the central portion of the heating wire 10 provides an improved response to the temperature variations of the latter.

Of the three embodiments mentioned above, the temperature sensitive junction of the wind sensitive thermocouple in the first and second embodiments is located not on the electrical heating wire directly, but at a position very close to the center of the heating wire. It should however be understood that such construction is given as an example of a structure suited for mass production.

As described above, the pair of thin metal rods may be replaced by thin metal tubes, the only requirements of these members being sufficient rigidity to serve as supporting posts to bear the electrical heating wire and sufficient electrical conductivity to provide an electrical path for the energizing current to the heating wire. They may be of any desired material and shape.

In addition, in the device according to the first embodiment, the thin metal rods 8 and 9 are preferably of the same metal as the wires 11 and 13, for the same reason that the thin metal rods 80 and 90 are of the same metal as wires 11 and 13 in the device according to the second embodiment.

In practice, while the output from the device of the invention is most advantageously applied through a linearizing amplifier to an indicating meter of the uniform scale type for reading the gas speed, as mentioned above, the output signal from the device may be applied to an indicating meter of the logarithmic scale type or it may be combined with a cathode ray tube or a paper web recorder instead of an indicating meter, as it is conventional with prior art thermoelectric gas speed meter.

Thus it will be seen that the invention has provided a compact micro device for detecting velocity of gas thermoelectrically which permits an accurate measurement of the local gas speed, and the device may be combined with a measuring unit to provide a thermoelectric gas speed meter for obtaining an accurate measurement of the local gas speeds within a narrow space when the gas stream has rapid temperature variations, such as the air speed distribution in the outlet port of a heater or defroster in an automobile or the like.

While the invention has been described with reference to particular embodiments thereof, it should be understood that various changes and modifications may be possible without departing from the spirit and scope of the invention.

What is claimed is:

1. A device for thermoelectrically detecting the velocity of a gas, for use in conjunction with a source of energy and with indicating and measuring means, said device comprising: a pair of metallic supports adapted to be connected to the source of energy, said supports being spaced apart from each other and each having a first end and a second end; said first ends being bevelled and said second ends being bundled together and electrically insulated from each other; an electrical heating wire extending across said first ends and conductively connected thereto; a first thermocouple comprising a first wire and a second wire, said first and second wires being of a different metal composition, one end of said first and second wires being conductively connected to each other proximate the central region of said heating wire; a second thermocouple comprising said second wire of said first thermocouple and a third wire, said second and third wires being of a different metal composition, said first and third wires being of same metal composition, one end of said second and third wires being conductively connected to each other; the ends of said first and third wires which are not connected to said second wire and serve as output terminals being adapted to be conductively connected to the indicating and measuring means.

2. The device according to claim 1, wherein said one end of said first wire and said one end of said third wire are conductively connected to said heating wire at points intermediate its ends and in close proximity to each other.

3. The device according to claim 1, wherein said one end of said third wire is conductively connected to said heating wire at point substantially intermediate its ends and said one end of said first wire is conductively connected to said third wire at a point proximate said one end thereof.

4. The device according to claim 1, wherein said one end of said first wire is conductively connected to said heating wire at a point substantially intermediate its ends and said one end of said third wire is conductively connected to said first wire at a point proximate said one end thereof.

5. The device according to claim 1, wherein said heating wire is conductively connected to said third wire at a point near said one end thereof and said one end of said first wire is conductively connected to said one end of said third wire.

6. The device according to claim 1, wherein said heating wire is conductively connected to said first wire at a point near said one end thereof and said one end of said third wire is conductively connected to said one end of said first wire.

7. The device according to claim 1, wherein said pair of metallic supports are metal rods.

8. The device according to claim 7, wherein the ends of said first and third wires are connected to the indicating and measuring means through another pair of metal rods bundled together with said first mentioned metal rods and electrically insulated therefrom and from each other.

9. The device according to claim 8, wherein forward portions of said first mentioned metal rods are so bent that they run parallel and opposite to each other in a common plane and are spaced a predetermined constant distance apart; and wherein one of said second mentioned metal rods extends upwardly to a position midway between the bends of the first mentioned metal rods, while the top end of the other of said second mentioned metal rods is bent to extend out of the plane which includes said forward portions of said first mentioned metal rods and in a direction transverse to the direction in which said forward portions are bent.

10. The device according to claim 9, wherein said first and said second mentioned metal rods are formed of Phosphor Bronze; said heating wire is Nichrome; said first and third wires are Chromel; and said second wire is Alumel.

11. The device according to claim 8, wherein said first mentioned metal rods are bifurcated at a predetermined distance from the respective ends thereof; the terminal parts of forward portions thereof being substantially parallel to shank portions thereof; the forward end of one of said second mentioned metal rods terminating near the bifurcation of said shank portions; and the forward end of the other of said second mentioned metal rods being formed with a bevelled end face and extending with a gentle curve to a position beyond said heating wire; and said last mentioned metal rod being laterally spaced from the plane which includes said forward portions of said first mentioned metal rods and said heating wire, and being positioned on the opposite side of said plane with its forward end lying in a plane normal to said plane.

12. The device according to claim 11, wherein said first mentioned metal rods are Phosphor Bronze; said second mentioned metal rods are Chromel; said heating wire is Nichrome; said first and third wires are Chromel; and said second wire is Alumel.

13. The device according to claim 1, wherein said pair of metallic supports are tubular conduits.

14. The device according to claim 13, wherein the ends of said first and third wires are connected to the indicating and measuring means through a pair of metal rods bundled together with said tubular conduits and electrically insulated therefrom and from each other.

15. The device according to claim 14, wherein forward portions of said tubular conduits are so bent that they run parallel and opposite to each other in a common plane and are spaced a predetermined constant distance apart; and wherein one of said metal rods extends upwardly to a position midway between the bends of said tubular conduits, while the top end of the other of said metal rods is bent to extend out of the plane which includes said forward portions of said tubular conduits and in a direction transverse to the direction in which said forward portions are bent.

16. The device according to claim 15, wherein said tubular conduits are stainless steel; said metal rods are Chromel; said first and third wires are Chromel; and said second wire is Alumel.

17. The device according to claim 13, wherein a junction point of said first thermocouple is located substantially on the central part of said heating wire, and a junction point of said second thermocouple is located forwardly of said heating wire in the longitudinal direction of forward portions of said tubular conduits.

18. The device according to claim 17, wherein said tubular conduits are stainless steel; said heating wire is Nichrome; said first and third wires are Chromel; and said second wire is Alumel.

19. The device according to claim 1, wherein a junction point of said second thermocouple is located forwardly of said heating wire in the longitudinal direction of forward portions of said metallic supports.

* * * * *